United States Patent
Gunji (10) Patent No.: US 7,583,369 B2
(45) Date of Patent: Sep. 1, 2009

(54) FLUORESCENCE SPECTROPHOTOMETER

(75) Inventor: Masahide Gunji, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 55 days.

(21) Appl. No.: 11/945,519

(22) Filed: Nov. 27, 2007

(65) Prior Publication Data

US 2008/0285028 A1    Nov. 20, 2008

(30) Foreign Application Priority Data

May 16, 2007 (JP) .............................. 2007-129943

(51) Int. Cl.
*G01N 21/64* (2006.01)
*G01J 3/443* (2006.01)

(52) U.S. Cl. ................. 356/72; 356/318; 250/458.1

(58) Field of Classification Search ............. 356/317, 356/318, 305, 307, 332, 334; 250/458.1, 250/459.1, 461.1, 461.2
See application file for complete search history.

(56) References Cited

U.S. PATENT DOCUMENTS 3,144,551 A * 8/1964 Webb et al. ................. 356/307

FOREIGN PATENT DOCUMENTS

| JP | S63-88412 | 4/1988 |
| JP | H03-274427 | 12/1991 |
| JP | 2001-83093 | 3/2001 |

* cited by examiner

*Primary Examiner*—F. L Evans
(74) *Attorney, Agent, or Firm*—J.C. Patents (57) ABSTRACT

The present invention compensates a fluctuation of a light-emitting intensity of a light source. First splitting portions (12, 13) in the present invention are used to split lights emitted from the light source, and an excitation light with a specific wavelength ($\lambda_{Ex}$) is incident to a sample element 15. Second splitting portions (16, 17) are used to split the lights from the sample element portion, and a fluorescence detecting portion 18 is used to measure the fluorescence intensity ($I_{Em}$). A reference light detecting portion 19 detects a specific wavelength ($\lambda_R$) of the lights without being selected by the first splitting portion, and then the light intensities detected by the reference light detecting portion are outputted and stored in a spectrum data storage portion 21. The intensity ($I_{Ex}$) of the excitation light is calculated according to the wavelength of the excitation light, the wavelength of the reference light, and the intensity of the reference light in the spectrum data. An output of the fluorescence spectrophotometer is calculated through the measured fluorescence intensity ($I_{Em}$) and the calculated intensity ($I_{Ex}$) of the excitation light.

15 Claims, 6 Drawing Sheets

FLUORESCENCE SPECTROPHOTOMETER

CROSS-REFERENCE TO RELATED APPLICATION

This application claims the priority benefit of Japanese application serial no. 2007-129943, filed on May 16, 2007. The entirety of the above-mentioned patent application is hereby incorporated by reference herein and made a part of this specification.

BACKGROUND OF THE INVENTION

1. Field of the Invention

The present invention relates to a fluorescence spectrophotometer for measuring fluorescence emitted from a sample by means of irradiating the sample with lights of a specific wavelength as excitation lights.

2. Description of Related Art

Fluorescence spectrophotometer is a device for performing relevant qualitative and quantitative analysis on a sample by allowing the substance to absorb lights (excitation lights) to have an excitation state and measuring the lights (fluorescence) emitted during the process of recovering from the excitation state to a ground state. The fluorescence spectrophotometer has the advantageous effects in terms of sensitivity and accuracy of quantitative measurement and can also be used as a detector for liquid chromatography.

Figure 5:
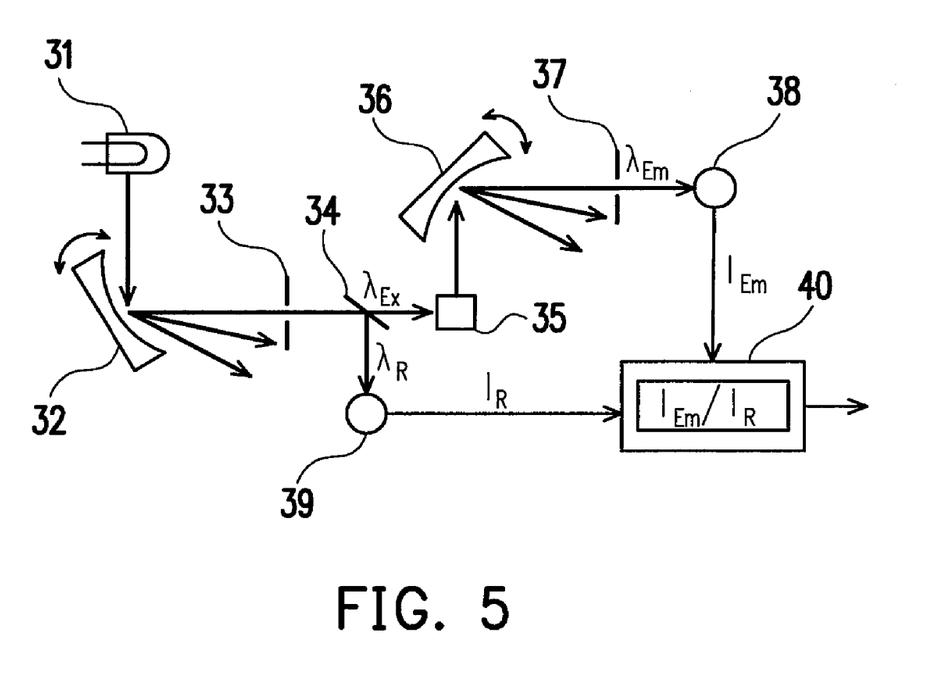
FIG. 5 is a general schematic view of a fluorescence spectrophotometer according to the conventional art.

Referring to FIG. 5, a common fluorescence spectrophotometer is illustrated. After the lights emitted from a light source 31 are split by a first splitting portion, that is, a light splitting portion at an excitation side (a diffraction grating 32, a slit 33), a light of an expected wavelength (excitation light) is irradiated to the sample in the sample element 35. The light irradiated onto the sample excites a part of electrons in the sample molecules having energy corresponding to the light, such that the sample molecules are caused to have an excitation state. Then, after the lights emitted during the process of recovering from the excitation state to the ground state are split by a second splitting portion, that is, the light splitting portion at the fluorescence side (a diffraction grating 36, a slit 37), the lights serve as lights of an expected wavelength $\lambda_{Em}$ for the sample fluorescence to reach an detecting portion 38. The fluorescence intensity is determined depending upon the intensity of the excitation light, such that the measurement on the fluorescence intensity may be significantly affected by the fluctuation of the excitation light intensity. In order to compensate the fluctuation of the excitation light intensity, the excitation light $\lambda_{Ex}$ from the light splitting portion at the excitation light side is split by a beam splitter 34 before being incident to the sample element 35, and a part of the lights is guided into a reference light detecting portion 39 as a reference light $\lambda_R$. After the signals from the fluorescence detecting portion 38 and the reference light detecting portion 39 are transmitted to a calculating portion 40, the output of the fluorescence detecting portion is calculated. The influences due to the fluctuation of the excitation light are restricted by taking the ratio of the fluorescence intensity to the intensity of the excitation light as the output of the fluorescence detecting portion. As disclosed in Japan Publication No. S63-88412, Japan Publication No. H03-274427 and Japan Publication No. 2001-83093, the configuration for the split lights to be incident to the sample element 35 is commonly used.

SUMMARY OF THE INVENTION

In order to obtain the reference light $\lambda_R$, an excitation light $\lambda_{Ex}$ incident to the sample element 35 is split; thus, the excitation light incident to the sample is reduced. If the intensity of the excitation light is lowered, the fluorescence emitted from the sample is reduced accordingly. If the output of the fluorescence spectrophotometer is weakened, the sensitivity of the fluorescence spectrophotometer is lowered, and thus the high-sensitivity analysis is affected. Moreover, in order to stabilize the signal, a part of the energies of the emitted light is consumed, and as a result, the potential performance may be influenced. The present invention is directed to compensating the intensity of the expected split lights, without sacrificing the light intensity.

In view of the above object, a fluorescence spectrophotometer of the present invention includes: a light source; a first splitting portion, for splitting lights emitted from the light source, and then selecting lights of an expected wavelength; a sample element portion, having the lights with all the expected wavelength selected by the first splitting portion as an excitation light being incident to the sample element portion; a second splitting portion, for splitting lights from the sample element portion; a light detecting portion, for detecting the lights from the second splitting portion; a reference light detecting portion, for detecting the lights without being selected by the first splitting portion; and a spectrum data storage portion, for storing an output of the light intensity detected by the reference light detecting portion as a spectrum data.

With this construction, after the lights emitted from the light source are split, all the selected lights of the expected wavelength are incident to the sample element. On the other aspect, the lights without being selected are incident to the reference light detecting portion. The lights incident to the reference light detecting portion are stored in the spectrum data storage portion as spectrum data.

Moreover, the fluorescence spectrophotometer of the present invention further includes a calculating portion, for reading the spectrum data from the spectrum data storage portion, and compensating the intensity of the excitation light incident to the sample element portion according to the ratio of the light intensity at a wavelength of the excitation light to that at a wavelength of the reference light in the spectrum data, and the output of the reference light detecting portion.

With this configuration, the following calculation is performed: after the spectrum data is read from the spectrum data storage portion, the intensity of the excitation light incident to the sample element portion is compensated according to the ratio of the light intensity at the wavelength of the excitation light to that at the wavelength of the reference light in the spectrum data, and the output of the reference light detecting portion.

Moreover, in the fluorescence spectrophotometer of the present invention, the excitation light incident to the sample element portion has a different wavelength or has different diffraction times but the same wavelength as the lights that are not being selected by the first splitting portion.

When other light, the light except for the excitation light, is being selected having a wavelength different from the excitation light or having different diffraction times but the same wavelength as the excitation light, the light is taken as a reference light.

Invention Effect

Since the intensity of the excitation light can be compensated without splitting the excitation light that irradiates the sample, the sample can be excited without losing the excitation light. Moreover, since the spectrum of the light source can be measured and stored, the influence caused by the spectrum of the light source changing with time can be reduced. That is, through the light intensity at the wavelength of the excitation light and that at the wavelength of the reference light, a more accurate ratio is obtained, such that the intensity of the excitation light is accurately compensated, so as to enhance the quantitative performance.

In order to make the aforementioned and other objectives, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
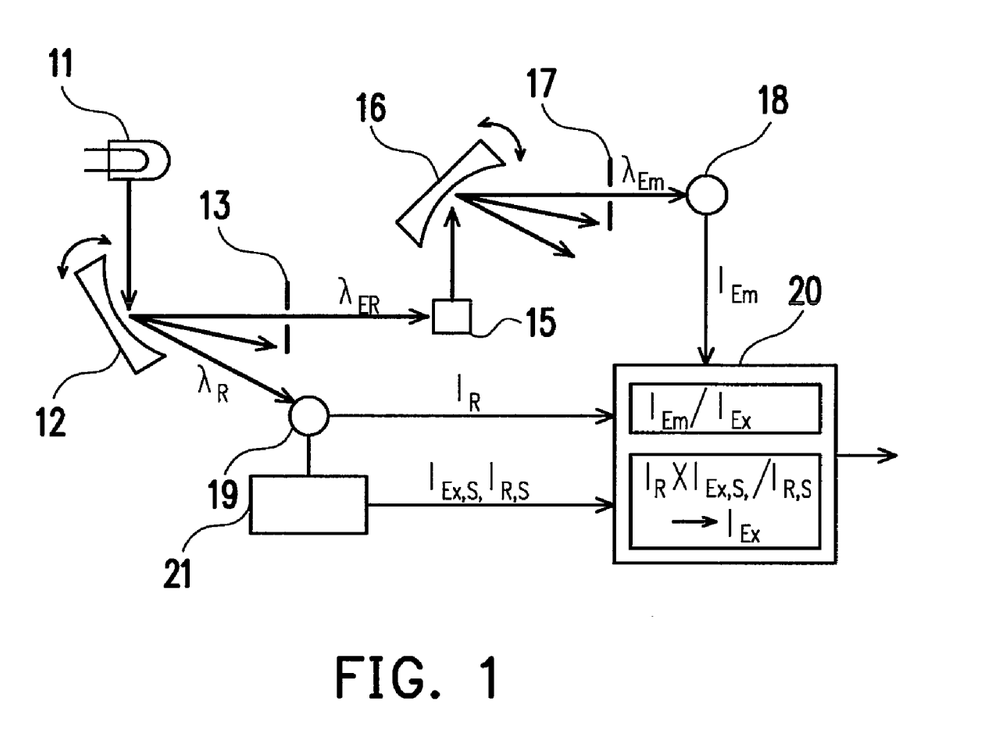
FIG. 1 is a general schematic view of a fluorescence spectrophotometer of the present invention.
Figure 2:
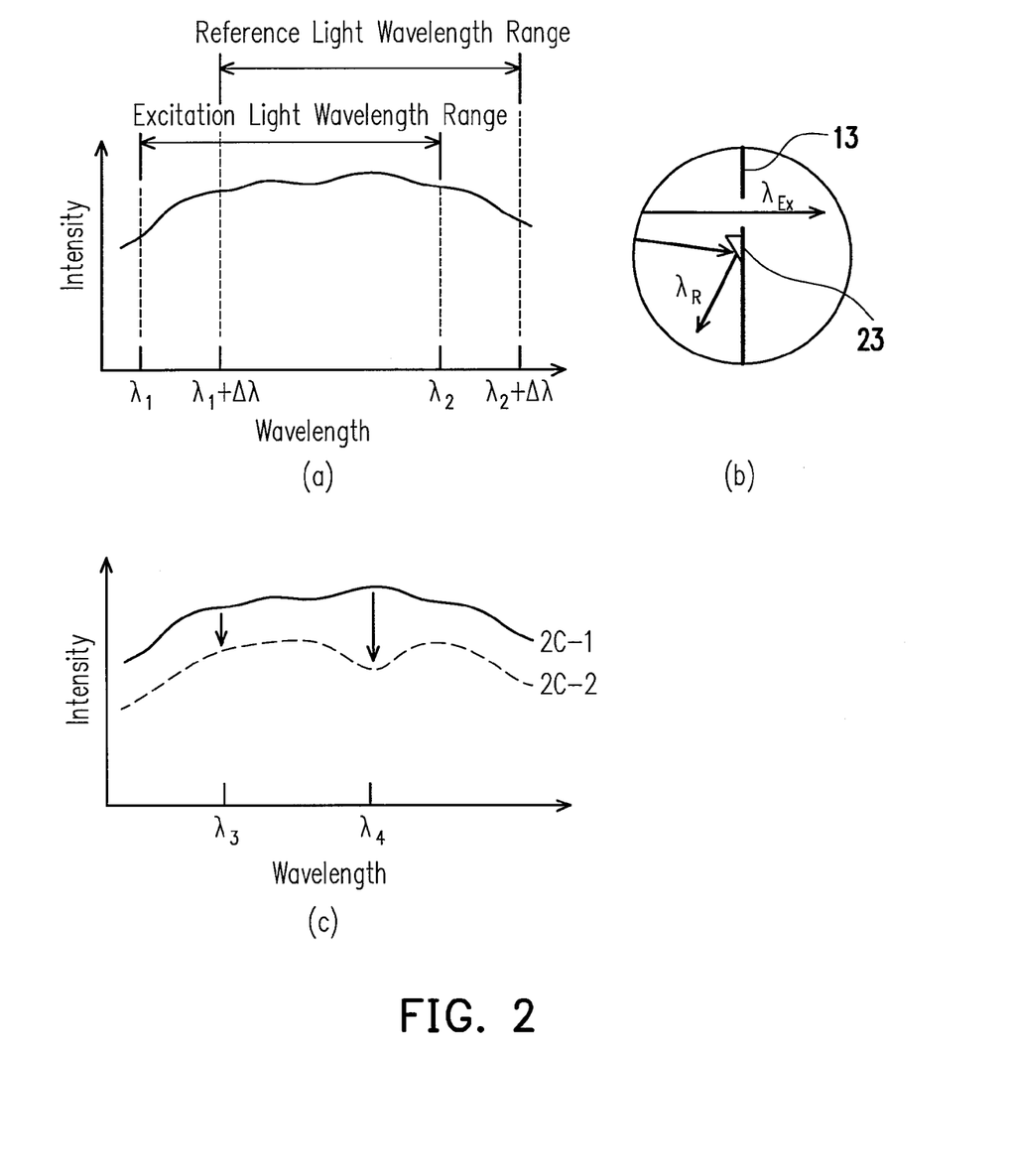
FIG. 2 is a concept chart of a spectrum recorded by the fluorescence spectrophotometer of the present invention.

Referring to FIGS. 1 and 2, a fluorescence spectrophotometer of the present invention is illustrated, which includes, as in a conventional fluorescence spectrophotometer, a light source 11; a first splitting portion, that is, a light splitting portion at an excitation side (a diffraction grating 32, a slit 33), for splitting lights from the light source and selecting the lights of an expected wavelength; a sample element 15, arranged with a sample to be detected; a second splitting portion, that is, a light splitting portion at a fluorescence side (a diffraction grating 16, a slit 17), for selecting lights with an expected wavelength of the fluorescence emitted from the sample in the sample element 15; and a detecting portion 18, for measuring the fluorescence intensity. In the fluorescence spectrophotometer of the present invention, a reference light detecting portion 19 as shown in FIG. 1 is arranged to measure lights having a wavelength different from the expected wavelength of the excitation light split by the light splitting portion at the excitation side. When the reference light detecting portion 19 has a relatively large irradiated surface, a slit is further arranged in front of the reference light detecting portion 19. Moreover, a spectrum data storage portion 21 is provided to record the light intensity measured by the reference light detecting portion 19 corresponding to the rotating angle of the diffraction grating 12. As for the light-emitting spectrum of the light source 11, the data of the wavelength $\lambda_S$ and the light intensity $I_S$ at the wavelength $\lambda_S$ are stored in the spectrum data storage portion 21. When the intensity of the excitation light is being compensated, the data is read from the spectrum data storage portion 21. The wavelength $\lambda_{Ex}$ of the excitation light is a value calculated according to a setting value, and the wavelength $\lambda_R$ of the lights incident to the reference light detecting portion 19 is a value calculated according to the setting value of the wavelength of the excitation light and the allocation of the optical system. Based on the two obtained wavelengths $(\lambda_{Ex}, \lambda_R)$ and the read spectrum, the light intensities $(I_{Ex, S}, I_{R, S})$ at each wavelength in the read spectrum are obtained.

The calculating portion 20 calculates the ratio of the intensity $I_{Ex}$ of the excitation light to the fluorescence intensity $I_{Em}$, and then performs the calculation on the compensation for the intensity of the excitation light based on the spectrum stored in the spectrum data storage portion 21. The intensity $I_R$ of the reference light actually measured by the reference light detecting portion 19 is multiplied by $I_{Ex, S}/I_{R, S}$, and the product equals to the intensity $I_{Ex}$ of the excitation light incident to the sample element 15. Based on the compensated intensity $I_{Ex}$ of the excitation light and the fluorescence intensity $I_{Em}$, the output of the fluorescence spectrophotometer is obtained.

As shown in FIG. 2(a), the spectrum measured by the reference light detecting portion 19 and the spectrum in the wavelength range of the excitation light are completely inconsistent within the wavelength range. If the wavelength range of the excitation light is set as $\lambda_1$ to $\lambda_2$, the wavelength range measured by the reference light detecting portion 19 will be $(\lambda_1+\Delta\lambda)$ to $(\lambda_2+\Delta\lambda)$ or $(\lambda_1-\Delta\lambda)$ to $(\lambda_2-\Delta\lambda)$. The value of $\Delta\lambda$ is determined depending upon the location of the reference light detecting portion 19, and the location of the reference light detecting portion 19 may be determined through considering the diffraction characteristics of the diffraction grating 12, the angle at which the lights from the light source are allowed to be incident, and the allocation of the slit that merely enables the lights of the selected wavelength to be penetrated.

If the value of $\Delta\lambda$ is reduced, a reference light having a wavelength close to the wavelength $\lambda_{Ex}$ of the excitation light is obtained. As shown in FIG. 2(b), a mirror 23 is disposed near the opening of the slit 13, such that the reference light $\lambda_R$ reflected by the mirror 23 is incident to the reference light detecting portion 19. The reference light $\lambda_R$ is then extracted. Meanwhile, since the opening of the slit 13 is a portion for imaging the lights of the selected wavelength, it is preferred that the mirror 23 is not in the optical path in order to avoid a decrease of the excitation light.

When the diffraction grating is used to split the lights, through the period d of the diffraction grating, the number N of slits in every 1 mm, the diffraction times m (m=0, ±1, ±2 . . . ), the wavelength λ, the angle (incident angle) α between the incident light and the normal of the diffraction grating, angle (diffraction angle) β between the diffraction light and the normal of the diffraction grating, the formula (grating formula): d (sin α±sin β)=mλ is satisfied, so that the light incident to the diffraction grating is diffracted in various angles according to the value of the diffraction times m. The simplest design for the location of the reference light detecting portion 19 is by allowing the lights in the wavelength range having the same diffraction times to be incident.

Generally, the light-emitting spectrum may change as the light source gets deteriorated. In FIG. 2(c), the transverse axis represents the wavelength, and the longitudinal axis represents the light intensity, for depicting the light-emitting spectrum of the light source. 2C-1 is a spectrum of a light source when being used for a short time, and 2C-2 is a spectrum of a light source which is deteriorated after being used for a long time. After the light source is deteriorated, the light intensity in the whole wavelength range will be lowered, and the shape of the spectrum (the wavelength having a characteristic wave peak) may change. Similar to the phenomenon that the spectrum is changed from the spectrum 2C-1 to the spectrum 2C-2, it is quite common for a light source to be significantly deteriorated in a specific wavelength range. In this case, the alteration of the magnitude of a specific wavelength ($\lambda_4$) becomes larger, which is different from those of other wavelengths (such as $\lambda_3$). Even so, in the fluorescence spectrophotometer of the present invention, the spectrum data corresponding to the changed spectrum is stored in the spectrum data storage portion 21, and the intensity is compensated based on the recently-measured spectrum data, and thus the analysis on the calculation can be conducted based on the accurate intensity of the excitation light.

Moreover, the light source 11 of the fluorescence spectrophotometer is preferably a xenon lamp that sends an intensive consecutive spectrum in a wide wavelength range from ultraviolet radiation, visible light, to infrared ray. The fluorescence detecting portion 18 and the reference light detecting portion 19 may be a photodiode or a photomultiplier tube.

Figure 3:
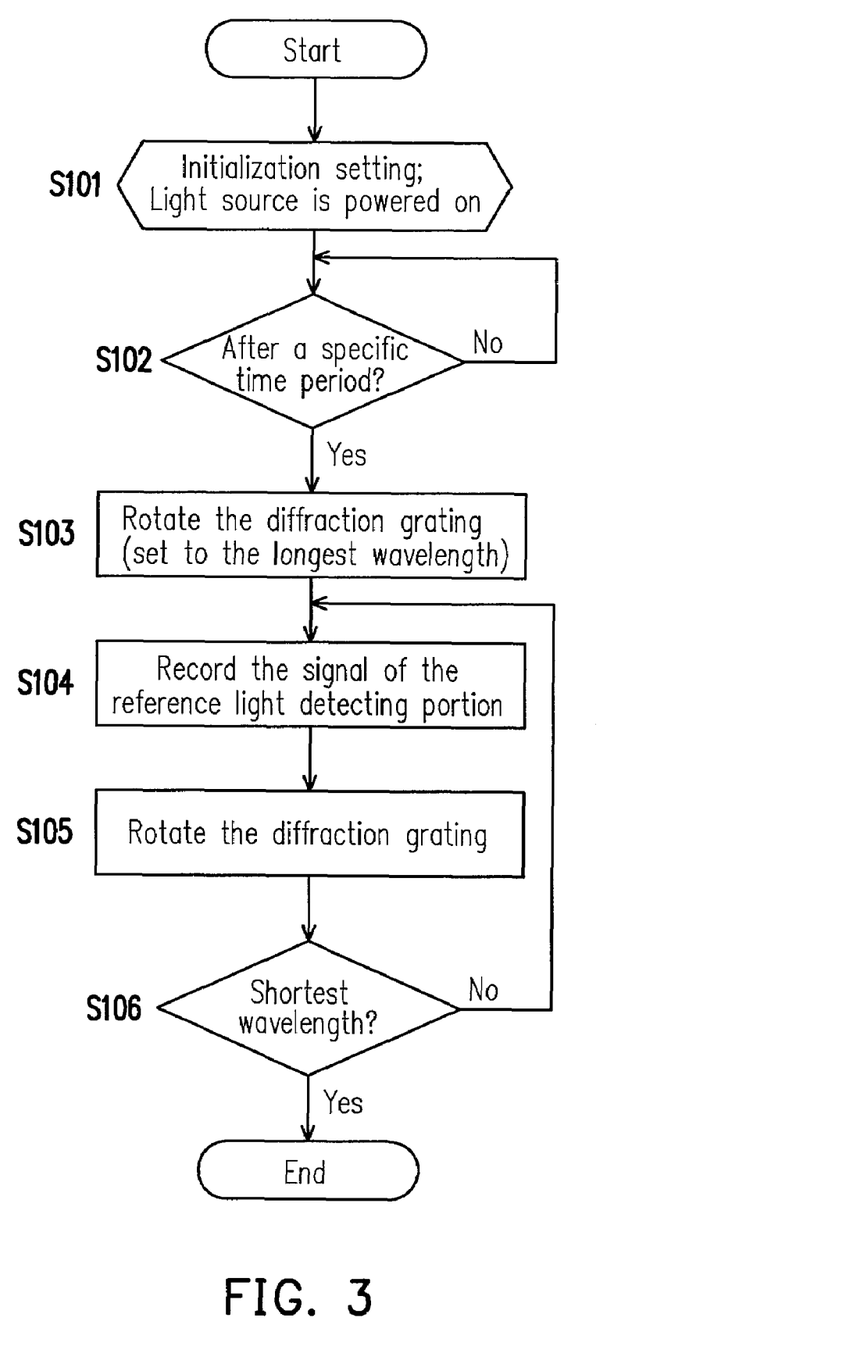
FIG. 3 is a flow chart of a process for storing a spectrum of a light source.
Figure 4:
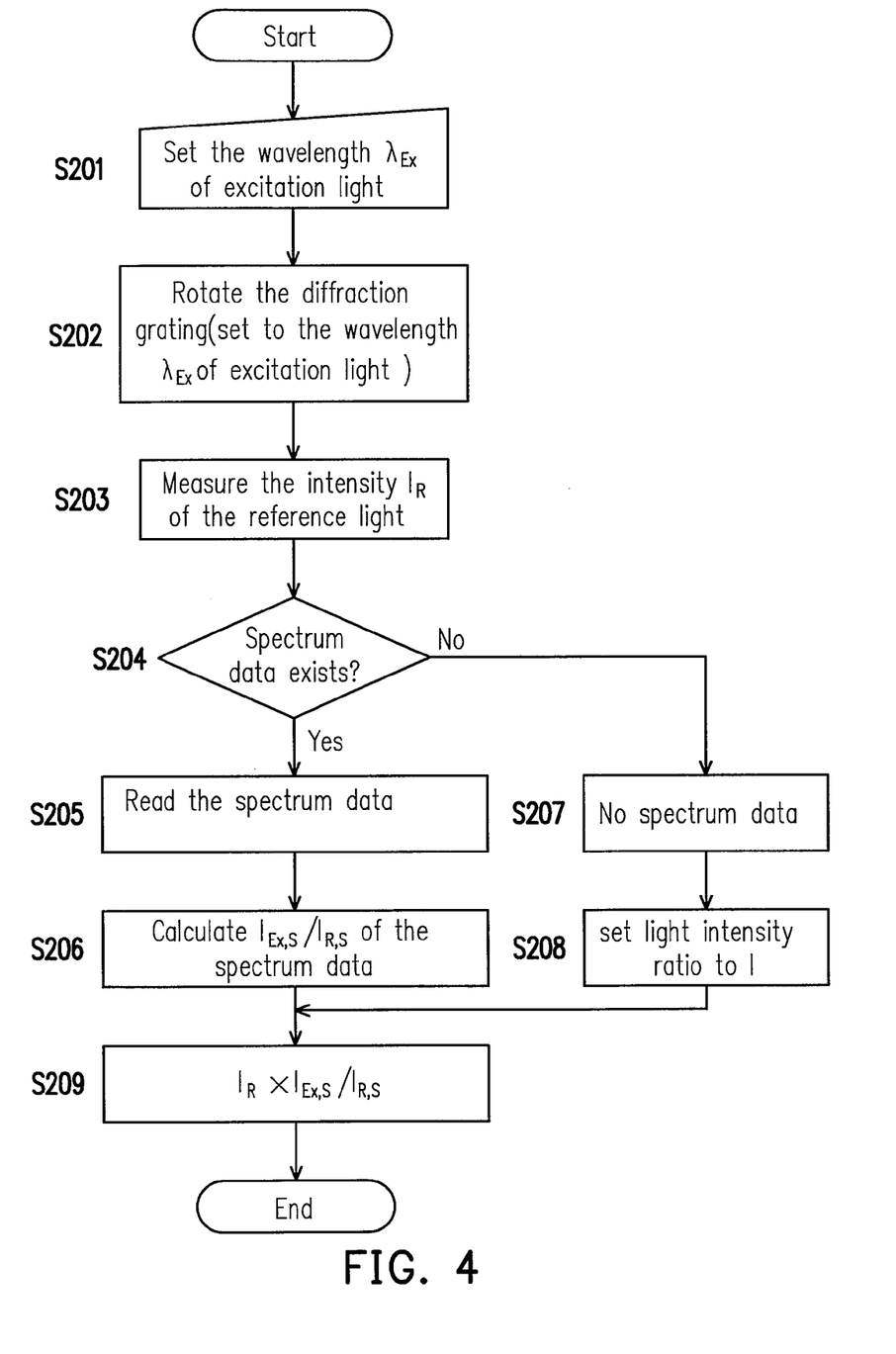
FIG. 4 is a flow chart of a process for compensating a light intensity by means of the fluorescence spectrophotometer of the present invention.

Referring to FIGS. 3 and 4, an operation for compensating the light intensity through the fluorescence spectrophotometer of the present invention is illustrated below in detail. The numerals used in the light source and the diffraction grating correspond to those in FIG. 1.

If the fluorescence spectrophotometer is powered on, the light source 11 is turned on (S101). Besides the light source 11 is turned on, the initialization of the controlling portion or the inspection on the operations of the optical parts is performed at the same time.

The light source 11 does not immediately emit lights stably once being turned on, and the temperature of the detecting portion (a fluorescence detecting portion 18, a reference light detecting portion 19) does not reach a steady state. After the power is turned on, the fluorescence spectrophotometer enters a stand-by state for a while (for example, 15 minutes) under a power-on state, so as to perform the so-called warm-up operation (S102).

After a specific time period, the diffraction grating 12 is rotated, and an angle capable of allowing the lights having the longest wavelength in the wavelength range of the excitation light to be incident to the sample element 15 is set (S103). Meanwhile, the lights having a wavelength $\lambda_R$ different from the wavelength $\lambda_{Ex}$ of the lights incident to the sample element 15 is incident to the reference light detecting portion 19, and thus the output of the reference light detecting portion 19 is stored in the spectrum data storage portion 21 (S104).

Next, the diffraction grating 12 is rotated to allow the lights at the short wavelength side to be incident to the sample element 15 (S105). A short-wavelength light having a minimum wavelength determined by the wavelength resolution of the excitation light is made to be incident to sample element 15, so as to obtain a more detailed spectrum data.

The diffraction grating is rotated repeatedly (S104), and the operation of outputting signals (S105) by the reference light detecting portion 19 is recorded, until the angle allowing the light having the shortest wavelength in the wavelength range of the excitation light to be incident is reached (S106). According to a series of operations, the light intensity of the lights incident to the reference light detecting portion 19 is stored in the spectrum data storage portion 21. In the spectrum data storage portion 21, the relationship between the wavelength of the light incident to the reference light detecting portion 19 and the intensity of the light incident to the reference light detecting portion 19 is stored as a spectrum data.

When the fluorescence spectrophotometer of the present invention is used to measure a sample, if the wavelength of the excitation light is set to $\lambda_{Ex}$ (S201), the diffraction grating 12 is rotated, and the lights having the wavelength $\lambda_{Ex}$ is incident to the sample element 15. Meanwhile, the light having a wavelength $\lambda_R$ different from that of the excitation light is incident to the reference light detecting portion 19 as a reference light, and thus the intensity $I_R$ of the reference light is measured (S203).

Moreover, whether the spectrum data exists in the spectrum data storage portion 21 or not (S204) is confirmed. Then, whether the spectrum data for appropriately compensating the excitation light exists or not is determined based on a specific determination basis. The determination basis includes: (1) whether the spectrum data itself exists or not; (2) the reliability of the spectrum data; and (3) the period for measuring the spectrum data. Based on all the determination basis, if the spectrum data is determined to be qualified, the spectrum data is adapted for compensating the excitation light.

(1) As for the existence of the spectrum data, it should determine whether the spectrum data is stored in the spectrum data storage portion 21 or not; if NOT, the following step S207 is proceeded; otherwise, the following determination is made.

(2) As for the reliability of the spectrum data, the following evaluations are conducted directed to the spectrum data existed in the spectrum data storage portion 21. For example, the data are measured when poor condition occurs to any portion during the initialization operation. The data obtained when the fluorescence spectrophotometer is in poor condition lacks reliability, and thus the spectrum data for appropriately compensating the excitation light is determined to be non-existed, and step S207 is proceeded. If the spectrum data has no problems in reliability, the following determinations are made.

(3) The period for measuring the spectrum data is evaluated. If the period for measuring the spectrum data is relatively long, the light source 11 is continuously changed further as time elapsed, and fluctuations of the spectrum are more likely to occur. In the data obtained by using the analysis apparatus such as the fluorescence spectrophotometer, the date for obtaining the data is recorded, and thus the evaluation may be conducted with the data. Otherwise, in the operating system (OS), the date for generating the document is inserted in a document, and thus the evaluation may be conducted with the document. Moreover, even if the spectrum data is generated recently, the light-emitting portion of the light source 11 also bears heavy loads due to the ON and OFF operations; thus, the evaluation is preferably performed based on whether the ON/OFF operations exist or not.

When a normal spectrum data exists, the spectrum data is read (S205). The ratio ($I_{Ex,S}/I_{R,S}$) of the intensity $I_{Ex,S}$ at the wavelength $\lambda_{Ex}$ of the excitation light to the intensity $I_{R,S}$ at the wavelength $\lambda_R$ of the reference light is calculated in the spectrum data recorded in the form of the relationship between the wavelength and the light intensity (S206), and this ratio is multiplied with the measured intensity $I_R$ of the reference light and the product ($I_R \times I_{Ex,S}/I_{R,S}$) is outputted as the light intensity incident to the sample element 15.

Based on the above determinations, if the spectrum data does not exist, or lacks reliability, or the spectrum data is obtained long time ago, no appropriate spectrum data existed (S207) is displaced, and the measured data (fluorescence spectrum) is informed to the operator as the data that has not been used for compensating the intensity of the excitation light. Upon knowing the spectrum data of the light source 11 does not exist, the operator performs an operation for supplementing the spectrum data of the light source 11 subsequent to the analysis that has been performing is finished. The measurement is performed when the $I_{Ex, S}/I_{R, S}$ is set to 1 (S208).

Moreover, the fluorescence spectrophotometer outputs the results based on the value of $I_R \times I_{Ex, S}/I_{R, S}$ (S209).

After the processing of S208, since $I_{Ex, S}/I_{R, S}=1$, the light intensity is not compensated. The spectrum data is supplemented before the waveform processing or the quantitative calculation, and the calculation on the compensation for the light intensity is thereby conducted.

After the fluorescence spectrophotometer is powered on, and the intensity of the lights emitted from the light source 11 is stabilized (approximately 15 minutes after being powered on), before or after the sample analysis, the spectrum is measured by the reference light detecting portion 19, so as to compensate the light intensity accurately.

The above embodiment is merely one of the embodiments of the present invention, suitable modifications and variations can be made without departing from the spirit and scope of the present invention. It should be noted that, the modifications and variations still fall within the scope of the present invention.

Figure 6A:
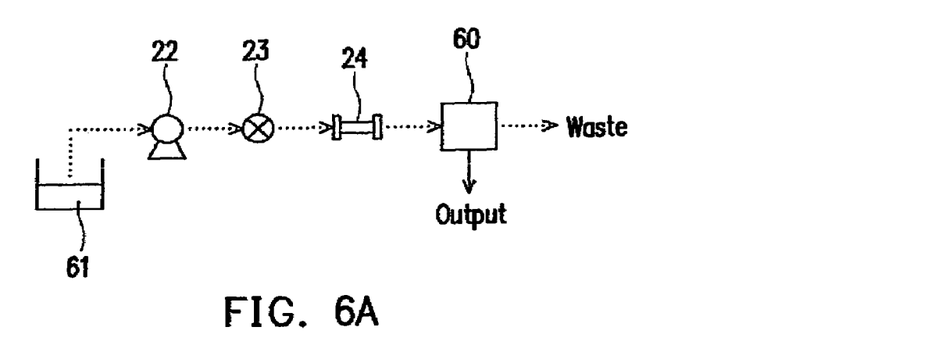
FIG. 6A is a general schematic view of a liquid chromatography according to an embodiment of the present invention.
Figure 6B:
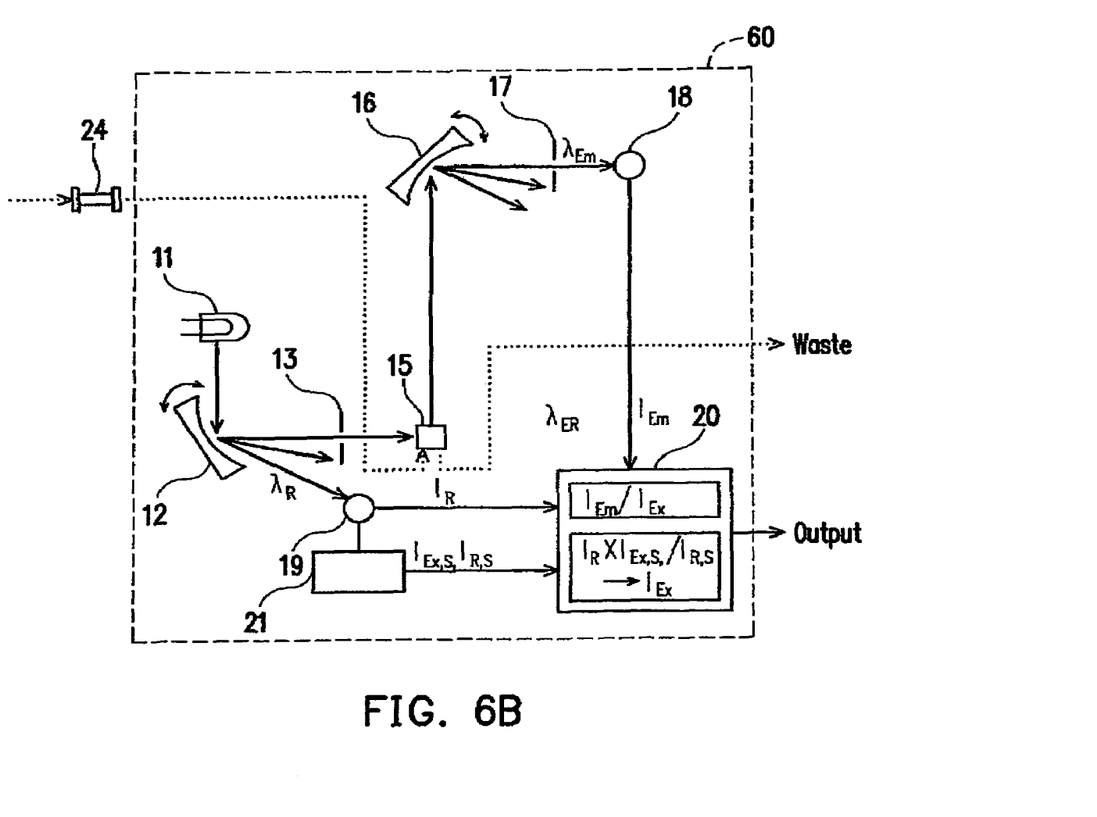
FIG. 6B is a general schematic view of a fluorescence spectrophotometer which is used in the liquid chromatography in FIG. 6A according to an embodiment of the present invention.

Please refer to both FIGS. 6A and 6B. FIG. 6A is a general schematic view of a liquid chromatography according to an embodiment of the present invention. FIG. 6B is a general schematic view of a fluorescence spectrophotometer which is used in the liquid chromatography in FIG. 6A according to an embodiment of the present invention. A fluorescence spectrophotometer 60 according to the present embodiment includes the elements 11 to 21 of the fluorescence spectrophotometer in FIG. 1. When a flow cell is used as the sample element portion in the fluorescence spectrophotometer in FIG. 6B, the flow cell may also be used as a detector for a liquid chromatography in FIG. 6A. The liquid chromatography in FIG. 6A includes: a pump 22 for transmitting a mobile phase 61, a sample injector 23 for guiding the sample into the mobile phase transmitted by the pump, a column 24 for separating the guided sample into each ingredient and the fluorescence spectrophotometer 60, for guiding the separated sample into the sample element portion.

INDUSTRIAL APPLICABILITY

The present invention can be used as a fluorescence spectrophotometer or a detector for a liquid chromatography.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. A fluorescence spectrophotometer, comprising: a light source; a first splitting portion, for splitting lights emitted from the light source, and then selecting lights of an expected wavelength; a sample element portion, with all the lights of the expected wavelength selected by the first splitting portion as excitation lights being incident to the sample element portion; a second splitting portion, for splitting the lights from the sample element portion; a light detecting portion, for detecting the lights from the second splitting portion; a reference light detecting portion, for detecting lights without being selected by the first splitting portion; and a spectrum data storage, for storing an output of a light intensity detected by the reference light detecting portion as a spectrum data.

2. The fluorescence spectrophotometer as claimed in claim 1, comprising a calculating portion, for reading the spectrum data from the spectrum data storage portion, and then compensating an intensity of the excitation light incident to the sample element portion according to a ratio of the light intensity at a wavelength of the excitation light to the light intensity at a wavelength of reference light in the spectrum data, and the output of the reference light detecting portion.

3. The fluorescence spectrophotometer as claimed in claim 1, wherein the excitation light incident to the sample element portion has a wavelength different from that of the lights without being selected by the first splitting portion.

4. The fluorescence spectrophotometer as claimed in claim 1, wherein the excitation light incident to the sample element portion has different diffraction times but has a same wavelength as the lights without being selected by the first splitting portion.

5. A liquid chromatography, comprising a pump for transmitting a mobile phase, a sample injector for guiding a sample into the mobile phase transmitted by the pump, and a column for separating the guided sample into each ingredient, and a fluorescence spectrophotometer as claimed in claim 1, for guiding the separated sample into the sample element portion.

6. A liquid chromatography, comprising a pump for transmitting a mobile phase, a sample injector for guiding a sample into the mobile phase transmitted by the pump, and a column for separating the guided sample into each ingredient, and a fluorescence spectrophotometer as claimed in claim 2, for guiding the separated sample into the sample element portion.

7. A liquid chromatography, comprising a pump for transmitting a mobile phase, a sample injector for guiding a sample into the mobile phase transmitted by the pump, and a column for separating the guided sample into each ingredient, and a fluorescence spectrophotometer as claimed in claim 3, for guiding the separated sample into the sample element portion.

8. A liquid chromatography, comprising a pump for transmitting a mobile phase, a sample injector for guiding a sample into the mobile phase transmitted by the pump, and a column for separating the guided sample into each ingredient, and a fluorescence spectrophotometer as claimed in claim 4, for guiding the separated sample into the sample element portion.

9. The fluorescence spectrophotometer as claimed in claim 1, wherein after the lights emitted from the light source are split, all the selected lights of the expected wavelength is incident to the sample element, and the lights without being selected are incident to the reference light detecting portion.

10. The fluorescence spectrophotometer as claimed in claim 1, wherein the lights incident to the reference light detecting portion are stored in the spectrum data storage as the spectrum data.

11. The fluorescence spectrophotometer as claimed in claim 9, wherein the lights incident to the reference light detecting portion are stored in the spectrum data storage as the spectrum data.

12. The fluorescence spectrophotometer as claimed in claim 1, wherein when the lights, except for the excitation light, are being selected having a wavelength different from that of the excitation light or having different diffraction times but having the same wavelength as the excitation light, the lights serve as a reference light.

13. The fluorescence spectrophotometer as claimed in claim 2, wherein when the lights, except for the excitation light, are being selected having a wavelength different from that of the excitation light or having different diffraction times but having the same wavelength as the excitation light, the lights serve as a reference light.

14. The fluorescence spectrophotometer as claimed in claim 3, wherein when the lights, except for the excitation light, are being selected having a wavelength different from that of the excitation light or having different diffraction times but having the same wavelength as the excitation light, the lights serve as a reference light.

15. The fluorescence spectrophotometer as claimed in claim 4, wherein when the lights, except for the excitation light, are being selected having a wavelength different from that of the excitation light or having different diffraction times but having the same wavelength as the excitation light, the lights serve as a reference light.

* * * * *